United States Patent [19]

Suyama

[11] Patent Number: 4,995,782
[45] Date of Patent: Feb. 26, 1991

[54] APPARATUS FOR ROTATING A WRIST OF A ROBOT

[75] Inventor: Yasuyuki Suyama, Uji, Japan

[73] Assignee: Tsubakimoto Chain Co., Japan

[21] Appl. No.: 21,103

[22] Filed: Mar. 3, 1987

Related U.S. Application Data

[63] Continuation-in-part of Ser. No. 752,942, Jul. 8, 1985, abandoned.

[30] Foreign Application Priority Data

Jul. 16, 1984 [JP] Japan ............................... 59-106385

[51] Int. Cl.$^5$ .............................................. B66C 1/00
[52] U.S. Cl. ..................................... 414/732; 901/24; 901/29
[58] Field of Search ............................. 901/23, 24, 29; 414/732, 735; 74/84 R, 813 L, 813 C, 816, 817; 198/345, 859

[56] References Cited

U.S. PATENT DOCUMENTS

| | | | |
|---|---|---|---|
| 2,549,663 | 4/1951 | Clark | 198/859 |
| 3,007,097 | 10/1961 | Shelley et al. | 901/23 |
| 3,330,056 | 7/1967 | Woodside et al. | 414/732 |

FOREIGN PATENT DOCUMENTS

| | | | |
|---|---|---|---|
| 1691 | 1/1982 | Japan . | |
| 10480 | 1/1983 | Japan . | |
| 194497 | 6/1967 | U.S.S.R. | 74/84 R |

*Primary Examiner*—Joseph E. Valenza
*Attorney, Agent, or Firm*—Howson & Howson

[57] ABSTRACT

An apparatus for rotating a wrist shaft of a robot comprising an indexing plate which is rotated by a motor through a friction coupling, a roller which is pressed against the indexing plate and which is disengaged from recesses in the indexing plate by an air cylinder. The motor and air cylinder are controlled by a timing mechanism which is responsive to indexing signals and to signals from a series of proximity switches, there being one proximity switch actuable at each of the several indexing positions. Indexing positions are selected by transmitting indexing signals to the timing mechanism. Upon receipt of an indexing signal requiring movement of the wrist shaft, the timing mechanism actuates the air cylinder, releasing the indexing plate. Immediately thereafter, it starts the motor. In the case of a single step indexing operation, the roller is released to engage the indexing plate after a predetermined time interval, and the power to the motor is thereafter cut off. In the case of a multiple step indexing operation, the timing mechanism releases the roller to engage the indexing plate following a predetermined interval after actuation of the proximity switch corresponding to the indexing position immediately preceding the selected indexing position. Again, the power to the motor is cut off after the roller engages the indexing plate. In each case, the roller engages the outer periphery of the indexing plate and the action of the roller against rounded transitions between the outer periphery and the recesses assists in rotating the wrist shaft to the selected indexing positions.

6 Claims, 4 Drawing Sheets

FIG. 5

| ROLLER POSITION  SIGNAL/OPERATION | IN THE RECESS A | POSITION BETWEEN RECESSES A AND B | POSITION BETWEEN RECESSES B AND C | IN THE RECESS C |
|---|---|---|---|---|
| SIGNAL FOR SEATING THE ROLLER AGAINST THE RECESS A | | | | |
| SIGNAL FOR SEATING THE ROLLER AGAINST THE RECESS B | | | | |
| SIGNAL FOR SEATING THE ROLLER AGAINST THE RECESS C | ON | | | |
| SIGNAL FOR SEATING THE ROLLER AGAINST THE RECESS D | | | | |
| PROXIMITY SWITCH A' | ON | | | |
| PROXIMITY SWITCH B' | | | | |
| PROXIMITY SWITCH C' | | | | ON |
| PROXIMITY SWITCH D' | | | ON | |
| AIR CYLINDER | T1 | | T3 | |
| MOTOR | T2 | | T4 | |

APPARATUS FOR ROTATING A WRIST OF A ROBOT

CROSS-REFERENCE TO RELATED APPLICATION

This is a continuation-in-part of my application Ser. No. 752,942, filed Jul. 8, 1985 and now abandoned.

FIELD OF THE INVENTION

This invention relates to a rotating apparatus for rotating a wrist of a robot to a desired indexing angle.

DESCRIPTION OF THE PRIOR ART

In the past, pneumatic rotary actuators, pneumatic cylinders or the like (such as disclosed in Japanes Patent Laid-Open Application Nos. 1691/82, 10480/83) have often been used for indexing of a robot wrist to any one of four fixed positions 90 degrees apart. These prior art devices satisfactorily achieve two-position indexing, but involve drawbacks in that in case of four-position indexing, construction and control become extremely complicated. In some cases, a locating pin is jointly used. In others, two cylinders, one long and one short, are used to stop an actuator at an intermediate position.

SUMMARY OF THE INVENTION

The principal object of the present invention is to avoid the complexity in construction and control inherent in prior multiposition indexing.

The gist of the present invention lies in the construction of an apparatus for rotating the wrist of a robot comprising an indexing plate secured to a wrist shaft. The shaft is rotated by a motor having a reduction gear, through a friction coupling. The indexing plate has a varying radius, there being recesses at the positions of the desired indexing angles in the outer periphery of the plate. A roller is pressed against the indexing plate by spring pressure and is disengaged from the recesses by a releasing force. A stopper is provided for limiting rotation of the indexing plate to that less than one rotation, and a different proximity switch is actuated at each indexing position. A control, responsive to the proximity switches, and to indexing signals corresponding to different selected indexing positions, performs three principal functions. First, it disengages the roller from the indexing plate and starts the motor whenever it receives an indexing signal other to the current indexing position. Second, it releases the roller before the selected indexing position is reached. Third, it cuts off power to the motor after release of the roller but before the selected indexing position is reached.

To rotate the wrist shaft to the desired indexing position, working pressure is supplied to an air cylinder holding the roller to move the roller back against spring pressure, thereby disengaging it from the recess in the indexing plate. Almost immediately thereafter, the motor is started, and begins to rotate the wrist shaft in a direction determined by the indexing signal and the current position of the wrist shaft as determined by the proximity switches. In the midst of rotation, immediately after a proximity switch actuating means on the wrist shaft has passed the proximity switch on the penultimate position of the desired indexing position, the air cylinder is exhausted and the roller is pressed against the outer periphery of the indexing plate by spring pressure. Shortly thereafter, power to the motor is cut off. When the recess arrives at the roller location, the roller is urged into the recess to stop rotation of the wrist shaft. Any excess rotation due to motor inertia, which continues until the motor stops, is not transmitted to the wrist shaft, because the friction coupling slips.

BRIEF DESCRIPTION OF THE DRAWINGS

The drawings show one embodiment of the present invention. .

FIG. 5 is a time diagram illustrating a typical indexing operation.

DETAILED DESCRIPTION OF THE INVENTION

Figure 1:
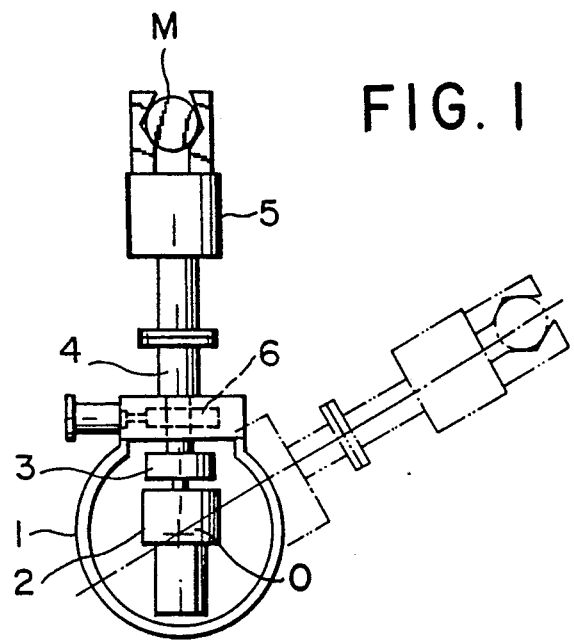
FIG. 1 is a schematic vertical section of a robot arm having a wrist rotating apparatus in accordance with the invention.

FIG. 1 shows the construction of a robot arm pivotally supported on a shaft at a point O. A wrist shaft 4 is rotatable by a motor 2 within case 1 through a friction coupling 3. The motor has a built-in reduction gear. A hand 5, for gripping a workpiece M, is flange-connected to the wrist shaft 4. The wrist shaft 4 may be tilted toward the position as indicated by the chain line about pivot point O and rotated to any one of a plurality of angular positions predetermined by an indexing plate 6.

Figure 2:
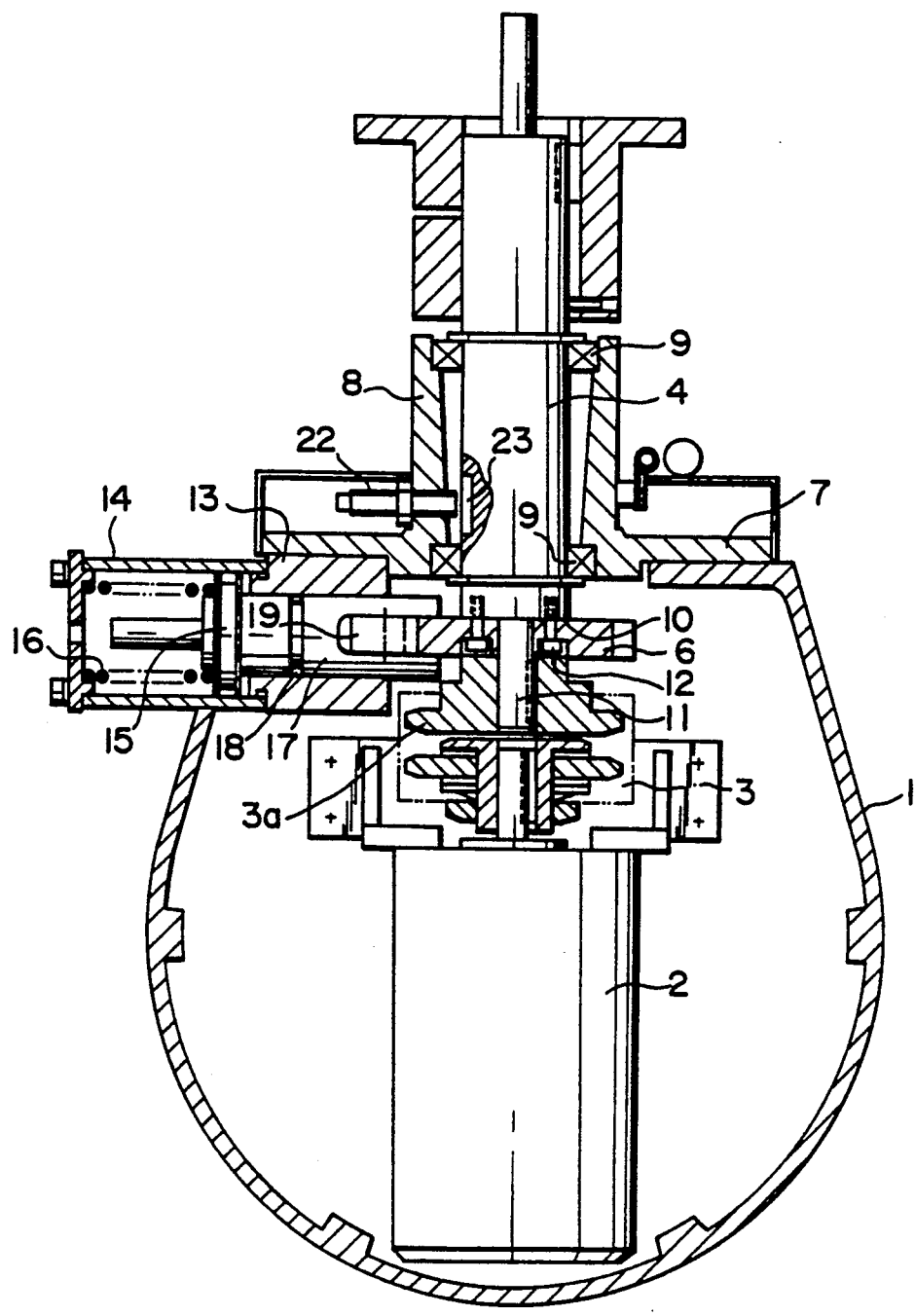
FIG. 2 is a detailed longitudinal section of the robot arm.

FIG. 2 shows the indexing and rotating mechanism associated with wrist shaft 4. The wrist shaft is supported by a bearing 9 on an outer cylidner 8 secured by a flange to the upper portion of case 1. A small diameter portion 11 of the wrist shaft continues downwardly from a should 10. The indexing plate 6 is secured to shoulder 10 by bolts 12 with the small diameter portion 11 extnding through a center hole. At the lower portion of the indexing plate 6, a driven portion 3a of the friction coupling 3 is secured to the small diameter portion 11.

To the side of the indexing plate 6, a cylinder housing 13 is secured to the lower flange of outer cylinder 8, and an air cylinder 14 is mounted on the outer end thereof. A piston 15 fitted into air cylinder 14 is urged toward shaft portion 11 by a compressed spring 16. Piston rod 17 slides within a cylinder housing 13, there being an air-tight seal 18 about the piston rod and in contact with the inner surface of cylidner housing 13. A roller 19 supported on the end of the piston rod 17 is pressed against indexing plate 6. The cylidner housing 13 is provided with an air port (not shown) to the right of piston 15, and when compressed air is fed into the cylinder tube 14 to impart a releasing force, piston 15 compresses the spring 16 and moves back to move roller 19 away from the indexing plate 6.

Figure 3:
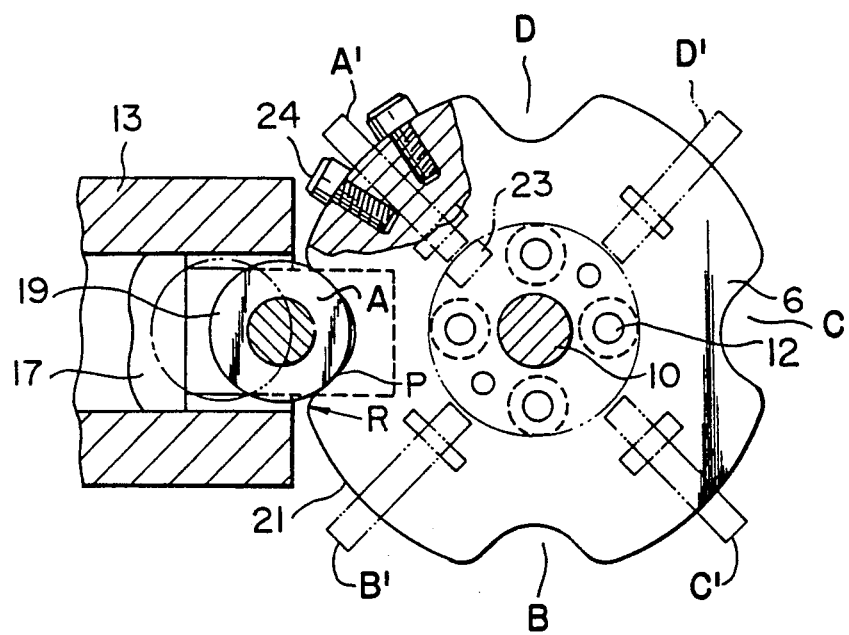
FIG. 3 is a plan view, partly in section, showing the indexing plate and the manner in which it cooperates with the roller.

In FIG. 3, four generally V-shaped recesses A, B, C and D are equidistantly formed in the outer periphery of the indexing plate 6. Each of these recesses has a shape such that roller 19 comes into contact with two points on the recess, the points being on opposite sides of the center of the recess. The recess is shaped so that a circular arc, having a relatively large radius R, extends from a contact point P to the outer circumference 21 of the indexing plate 6. Accordingly, when the indexing plate rotates so that a recess comes close to the roller 19, the roller 19 enters the recess relatively slowly along the circular surface of radius R to stop the indexing plate 6, while avoiding a sudden change in the angular velocity of the indexing plate. The change of said angular velocity effected by the roller 19 is smoothly accommodated by the slip allowed by friction coupling 3.

The wrist shaft 4 is subjected to inertia torque at the time of rotation, and torque resulting from bias of center of gravity of workpiece M when the arm is tilted from the vertical position. However, the force of spring 16 is preset to prevent roller 19 from being disengaged from the recesses A, B, C and D by such torques.

Four proximity switches A', B', C' and D' are mounted at angular positions between the recesses in the outer cylinder 8, and one proximity switch actuating means (recess) 23 is provided on wrist shaft 4. A signal is generated from a proximity switch whenever the wrist shaft 4 approaches an indexing position.

A stopper 24 is mounted on the indexing plate 6 to limit rotation of the plate to less than one full rotation. Consequently, each indexing position may be determined with the stopper 24 as a reference.

Figure 4:
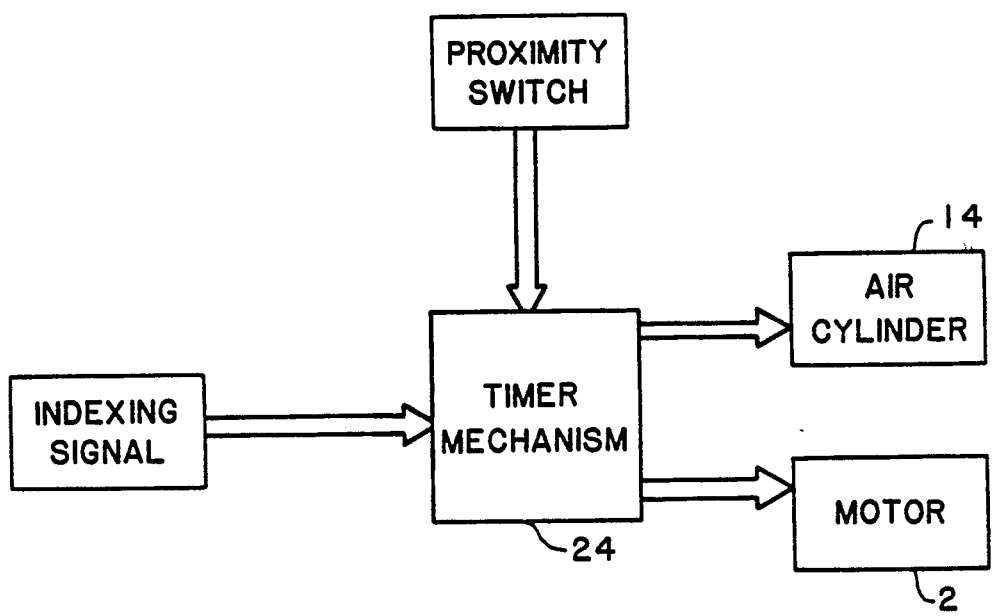
FIG. 4 is a block diagram showing control components of the indexing mechanism.

As shown in FIG. 4, air cylinder 14 and motor 2 are controlled by a timer mechanism 24 which is responsive both to indexing signals, and to signals from the proximity switches. A different indexing signal is given to the timer mechanism for each indexing position. Similarly, a different proximity switch signal is given for each indexing position. This is conveniently accomplished by virtue of the fact that the number of proximity switches corresponds to the number of indexing positions.

Operation of the timer mechanism is initiated by an indexing signal, and the timer mechanism first activates the air cylinder after a short interval, to release the indexing plate, allowing the wrist shaft to rotate. Shortly after the air cylinder releases the indexing plate, the motor begins to operate in a direction determined by the relationship between the indexing signal and the position of the proximity switch actuating recess 23, as determined by the proximity switches.

In the case in which the wrist shaft is to be indexed through only one step, that is through 90 degrees in the case of a four position device, the timer mechanism releases the air cylidner after a predetermined interval following the initiation of the indexing signal, allowing the roller to engage the outer periphery of the indexing plate. The timer then allows the motor to continue to operate until the rounded portion of the next recess reaches the roller location. The timer cuts off the power to the motor, and the action of the roller against the rounded entry portion of the recess assists in rotating the wrist shaft until the roller fully enters the recess and is engaged with both sides thereof, whereupon the wrist shaft stops at its new position.

In the case of a multiple-step indexing operation, the timer mechanism is activated by an indexing signal in the same manner as in a single step indexing operation, the air cylinder is activated, and the motor begins to rotate. However, the timer mechanism does not release the air cylinder and deactivate the motor until after the proximity switch actuating recess reaches the proximity switch corresponding to the position immediately preceding the desired indexing position. When the wrist shaft reaches the position immediately preceding the desired indexing position, a timing interval begins. At the end of this timing interval, the air cylinder is released, and shortly thereafter, power to the motor is cut off. The wrist shaft stops at the desired indexing position in the same manner as in a single step indexing operation.

The multiple step indexing operation is illustrated in FIG. 5, in which it is assumed that the roller is initially located in recess A, and it is desired to move the wirst shaft so that the roller is located in recess C. That is, a two step or 180 degree indexing operation is desired.

An indexing signal is given to the timer mechanism, calling for the seating of the roller against recess C. At this time, the proximity switch actuating recess 23 is adjacent to proximity switch A', and consequently switch A' produces a proximity switch signal. After a short time interval $T_1$, the timer mechanism 24 causes the air cylinder to operate, moving roller 19 away from the indexing plate. After an interval $T_2$ following initiation of the indexing signal, the motor begins to operate in the proper direction, as established by the relationship between the indexing signal and the proximity switch signal. Interval $T_2$ is preferably slightly longer than interval $T_1$, so that the motor is activated only after the roller clears the recess of the indexing plate.

As the indexing plate rotates, the proximity switch actuating recess 23 actuates proximity switch D', which prduces a proximity switch signal as shown. When this proximity switch signal is given to the timer mechanism, third and fourth time intervals $T_3$ and $T_4$ respectively begin. At the end of the time interval $T_3$, while the roller is located between recesses B and C, the timer mechanism releases the air cylinder. Shortly after the release of the air cylinder, at the end of interval $T_4$, the power to the motor is cut off. This occurs approximately at the same time proximity switch C' is actuated At this time, the roller is already in engagement with the rounded entry portion fo recess C. The wrist shaft continues to rotate until the roller is in engagement with both sides of recess C, whereupon the wrist shaft stops in the desired indexing position.

If an indexing signal is given which corresponds to the position which the wrist shaft is already in, the timer mechanism does not respond.

In summary, for each of the possible indexing positions, there is a unique indexing signal, and a unique proximity signal. The timer mechanism serves as a control, responsive both to the proximity signals and to the indexing signals. The timer mechanism performs three functions. First, it initiates operation of the air cylinder to disengage the roller from the wrist shaft, and also initiates operation of the motor. The air cylinder and motor are operated whenever the timer mechanism receives an indexing signal other than one corresponding to the current indexing position of the wrist shaft. Secondly, the timer mechanism releases the air cylinder before the selected indexing position is reached. Third, the timer mechanism cuts off power to the motor after release of the air cylinder, but before the selected indexing position is reached. Consequently, the roller is urged against the outer periphery of the indexing plate before the wrist shaft reaches the selected indexing position so that the action of the roller against the rounded transition between the periphery of the indexing plate and the recess assists in moving the wrist into the selected indexing position.

In accordance with the invention, the indexing plate is rotated and driven by a motor through a friction coupling, and the indexing position is determined by pressing the roller against one of several recesses provided in the indexing plate. Therefore, the number of required parts is small and the construction is simple. A standard type of reversible motor with a reduction gear can be used to drive the wrist shaft. This results in low cost and easy maintenance. The invention has the further advantage that no deviation occurs in indexing position due to wear of the indexing plate. Consequently, indexing accuracy is maintainable for a long period of time. Mechanical shocks are avoided when the wrist shaft is stopped at the indexing position because of the shape of recesses and the operation of friction coupling.

The invention can be modified in several respects. For example, the indexing operation can be carried out using a single proximity switch, provided that the control apparatus maintains a record of the position of the wrist shaft. For example, the control apparatus could keep account of the position of the wrist shaft by means of an electronic counter or by means of a stepping switch.

I claim:

1. Apparatus for rotating the wrist of a robot to selected indexing positions comprising:
   a wrist shaft movable to a plurality of indexing positions;
   a motor;
   a friction coupling connecting the motor in driving relationship with the wrist shaft;
   an indexing plate secured to the wrist shaft, the indexing plate having recesses in its periphery at positions corresponding to said indexing positions, the transitions between the outer periphery of the indexing plate and the recesses therein being convexly rounded and smoothly merging with said outer periphery;
   a roller having a size such that it is able to engage each recess on both sides of the center thereof when the wrist shaft is in an indexing position;
   spring means for pressing the roller against the periphery of the indexing plate;
   proximity switch means;
   means for actuating the proximity switch means each time the wrist reaches an indexing position;
   means for disengaging the roller from the periphery of the indexing plate; and
   control means repsonsive to the proximity switch means and to indexing signals corresponding to different selected indexing positions,
      for initiating operation of the disengaging means and motor upon receiving any indexing signal other than one corresponding to the current indexing position of the wrist,
      for releasing the disengaging means before the selected indexing position is reached, and
      for cutting off power to the motor after release of the disengaging means but before the selected indexing position is reached;
   whereby the roller is urged against the periphery of the indexing plate before the wrist shaft reaches the selected indexing position so that the action of the roller against the convexly rounded trasition between the periphery of the indexing plate and the recess assists in moving the wrist into the selected indexing position.

2. Apparatus for rotating the wrist of a robot to selected indexing positions ocmprising:
   a wrist shaft movable to a plurality of indexing positions;
   a motor;
   a friction coupling connecting the motor in driving relationship with the wrist shaft;
   an indexing plate secured to the wrist shaft, the indexing plate having recesses in its periphery at positions corresponding to said indexing positions, the transitions between the outer periphery of the indexing plate and the recesses therein being convexly rounded and smoothly merging with said outer periphery;
   a roller having a size such that it is able to engage each recess on both sides of the center thereof when the wrist shaft is in an indexing position;
   spring means for pressing the roller against the periphery of the indexing plate;
   proximity switch means;
   means for actuating the proximity switch means each time the wrist reaches an indexing position;
   means for disengaging the roller from the periphery of the indexing plate; and
   control means responsive to the proximity switch means and to indexing signals corresponding to different selected indexing positions,
      for inititating operation of the disengaging means and motor upon receiving any indexing signal other than one corresponding to the current indexing position of the wrist,
      for releasing the disengaging means after a predetermined interval following the indexing signal but before the selected indexing position is reached if the selected indexing position is the position immediately following the current indexing position, and, if the selected indexing position does not immediately follow the current indexing position, releasing the disengaging means after a predetermined interval following actuation of the proximity switch means when the wrist shaft is in the indexing position preceding the selected indexing position but before the selected indexing position is reached, and
      for cutting off power to the motor after release of the disengaging means but before the selected indexing position is reached;
   whereby the roller is urged against the periphery of the indexing plate before the wrist shaft reaches the selected indexing position so that the action of the roller against the convexly rounded transistion between the periphery of the indexing plate and the recess assists in moving the wrist into the selected indexing position.

3. Apparatus for rotating the wrist of a robot to selected indexing positions comprising:
   a wrist shaft movable to a plurality of indexing positions;
   a motor;
   a friction coupling connecting the motor in driving relationship with the wrist shaft;
   an indexing plate secured to the wrist shaft, the indexing plate having recesses in its periphery at positions corresponding to said indexing positions, the transitions between the outer periphery of the indexing plate and the recesses therein being convexly rounded and smoothly merging with said outer periphery;
   a roller having a size such that it is able to engage each recess on both sides of the center thereof when the wrist shaft is in an indexing position;
   spring means for pressing the roller against the periphery of the indexing plate;

a plurality of proximity switches, there being one proximity switch for each indexing position;

actuating means carried by the wrist shaft for actuating each proximity switch at the time when the wrist shaft is in the indexing position corresponding to that proximity switch;

means for disengaging the roller from the periphery of the indexing plate; and control means responsive to the proximity switches and to indexing signals corresponding to different selected indexing positions, for initiating operation of the disengaging means and motor upon receiving any indexing signal other than one corresponding to the current indexing position of the wrist, for releasing the disengaging means after a predetermined interval following the indexing signal but before the selected indexing position is reached if the selected indexing position is the position immediately following the current indexing position, and, if the selected indexing position does not immediately follow the current indexing position, releasing the disengaging means after a predetermined interval following actuation of the proximity switch corresponding to the indexing position preceding the selected indexing positin but before the selected indexing position is reached, and for cutting off power to the motor after release of the disengaging means but before the selected indexing position is reached;

whereby the roller is urged against the periphery of the indexing plate before the wrist shaft reaches the selected indexing position so that the action of the roller against the convexly rounded transition between the periphery of the indexing plate and the recess assists in moving the wrist into the selected indexing position.

4. Apparatus according to claim 1 in which the control means releases the disengaging means before the selected indexing position is reached whereby the roller is urged against the outer periphery of the indexing plate before the unit shaft reaches the selected indexing position.

5. Apparatus according to claim 2 in which the control means releases the disengaging means before the selected indexing position is reached whereby the roller is urged against the outer periphery of the indexing plate before the unit shaft reaches the selected indexing position.

6. Apparatus according to claim 3 in which the control means releases the disengaging means before the selected indexing position is reached whereby the roller is urged against the outer periphery of the indexing plate before the unit shaft reaches the selected indexing position.

* * * * *